Dec. 3, 1935.  P. M. JARECKI ET AL  2,022,769
CAN HOLDER
Filed Sept. 18, 1933
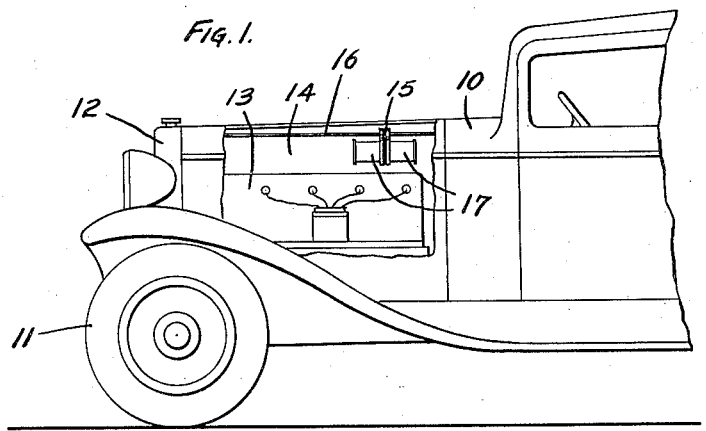
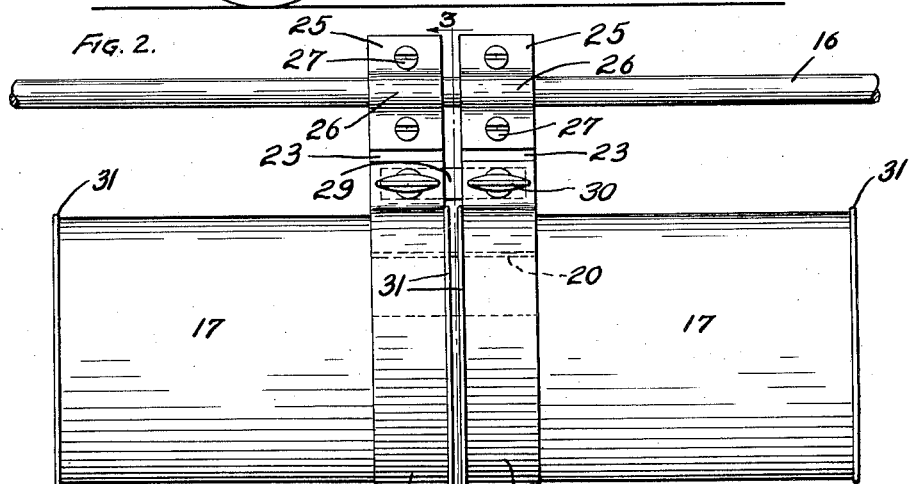
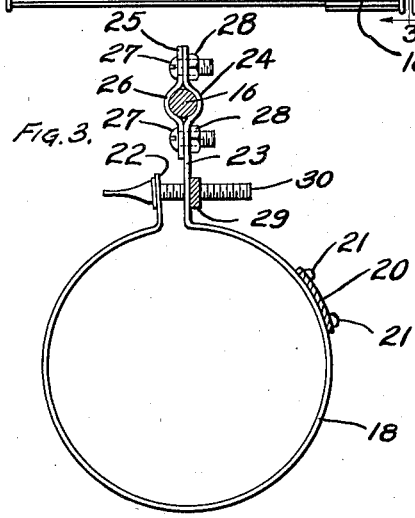
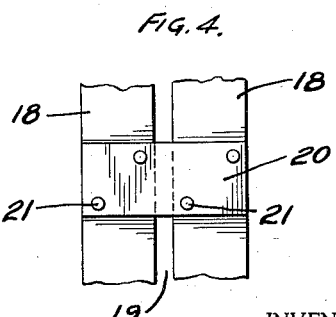
INVENTOR.
P. M. JARECKI
E. J. SOBCZAK
BY
ATTORNEY.

Patented Dec. 3, 1935

2,022,769

UNITED STATES PATENT OFFICE 2,022,769

CAN HOLDER

Peter M. Jarecki and Frank J. Sobczak, Chicago, Ill.

Application September 18, 1933, Serial No. 689,910

4 Claims. (Cl. 248—311)

The present invention relates to oil-can holders and has for its object the provision of a clamping member including a pair of spaced annular band elements wherein a pair of oil-cans positioned therewithin in an end to end relation may be securely held.

A further object of the present invention is the provision of a suitable clamp holder of the character indicated which may be positioned within a vehicle for the purpose of securely holding one or more cans of oil, thereby obviating frequent stopping of the vehicle at oil stations.

Another object of the present invention is the provision of an oil-can holder which may be inexpensive in manufacture and simple in construction and which may be durable and positive in its operation against constant vibration of a vehicle while the same is used in connection therewith.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a fragmentary elevational view of a vehicle, having a hood partly broken away to show the use of the present device in connection with a vehicle;

Fig. 2 is a side elevational view of the device while the same is used for the purpose of holding one pair of oil-cans;

Fig. 3 is a transverse cross-sectional view through the device, the view having been taken on line 3—3 of Fig. 2; and Fig. 4 is a side fragmentary elevational view showing a brace for rigidly connecting the two clamping elements used in connection with the present device.

Referring to the present drawing and more particularly to Fig. 1 thereof there is shown therein a vehicle generally indicated by 10, including front wheel 11, radiator 12, engine 13 and engine compartment 14. The present device, generally indicated by numeral 15 on Fig. 1 is intended to be rigidly affixed to and suspended from one of the connecting rods 16, which connect radiator 12 with a board (not shown) which separates engine compartment 14 from the tonneau of the vehicle. A pair of oil-cans held by the holder 15 is likewise shown upon Fig. 1 and indicated by numeral 17.

The oil-can holder includes a pair of identically constructed clamping members, each of the latter including a resilient annular band 18 spaced from each other to define, by their inner edges, recess 19, and rigidly connected by brace 20, which is rigidly affixed to said bands 18 by rivets 21 or by any other suitable means.

One of the ends of each of said bands 18 is bent and radially extends from its respective band to define ear 22.

The opposite end of each band 18 is similarly bent and likewise radially extends from the body portion of its respective band but is longer than ear 22, to define arm 23, which, adjacent its free end is suitably formed to define a semi-annular elbow 24.

The device further includes a pair of clamping plates 25, one co-operating with each of said arms 23, each of said plates 25 transversely thereof, and substantially at a central portion thereof, is formed into a semi-annular elbow 26, which co-operates with elbow 24 for clamping rod 16, as is clearly seen on Figs. 2 and 3. Said clamping plates 25 are rigidly affixed to arms 23 by means of screws 27 and nuts 28 to rigidly clamp said rod 16 therebetween.

The device further includes an oblong plate 29 positioned upon one of the faces of the two arms 23 and which is engaged by thumb screw 30 through which the latter is adapted to pass for the purpose of tightening bands 18. Said plate 29 does not necessarily have to be in any manner rigidly affixed to arms 23, but by virtue of its connection with screws 30 said plate 29 further tends to hold the two clamping members and arms 23 in rigid relative position.

From Fig. 2 it will be seen that the device herein described is adapted to hold a pair of conventional oil-cans 17, each of which is provided with usual end beads 31, one of which in each can is adapted to enter recess 19, said recess substantially having the width of two beads 31, as seen on Fig. 2. Thus, when the cans are in position in the clamp as shown on Fig. 2, and thumb screws 30 are tightened it will be impossible for any of the two cans to make either rotary or longitudinal creeping movement even during the travel and consequent vibration of the vehicle.

While there is described herein a preferred embodiment of the present invention, it is nevertheless to be understood that minor changes may be made therein without departing from the spirit and scope of the invention as claimed.

What we claim as new is:

1. A can holder adapted to hold a pair of cans of the type having beads at their ends, comprising a pair of annular resilient bands, said bands being spaced to define a slot for accommodating therewithin beads of a pair of cans, a brace connected to said bands for maintaining the same in rigid relative position, one end of said bands being outwardly radially bent to define ears, the opposite end of each of said bands being radially bent to define arms, mounting means at the free ends of said arms, and means at said ears co-operating with said arms for tightening said bands for clamping the cans therewithin.

2. A can holder adapted to hold a pair of cans of the type having beads at their ends, comprising a pair of annular resilient bands, said bands being spaced to define a slot for accommodating therewithin beads of a pair of cans, a brace rigidly connected to said bands for maintaining the same in rigid relative position, one end of said bands being outwardly radially bent to define ears, the opposite end of each of said bands being radially bent to define arms, mounting means at the free ends of said arms, means at said ears co-operating with said arms for tightening said bands for clamping the cans therewithin, and a removable plate transversely connecting said arms for providing additional means for holding said arms and said bands in relative rigid position.

3. A can holder adapted to removably hold in substantially abutting end to end relation a pair of cans of the type having beads at their ends, comprising a pair of annular clamping bands, means rigidly connecting said clamping bands in adjacent relation for retaining reception of the adjacent ends of the pair of cans and for engagement with the inner sides of the beads at said adjacent ends of the cans, and means for securing said bands to a support.

4. A can holder adapted to removably hold in substantially abutting end to end relation a pair of cans of the type having beads at their ends, comprising a pair of annular clamping bands, means rigidly connecting said clamping bands in adjacent relation for retaining reception of the adjacent ends of the pair of cans and for engagement with the inner sides of the beads at said adjacent ends of the cans, and means for securing said bands to a support, the space between said clamping bands substantially corresponding to the combined widths of the two beads on the adjacent ends of the pair of cans.

PETER M. JARECKI.
FRANK J. SOBCZAK.